Oct. 21, 1930.  J. T. C. VAN DOOREN  1,779,378
ILLUMINATING DEVICE
Filed May 29, 1930  2 Sheets-Sheet 1
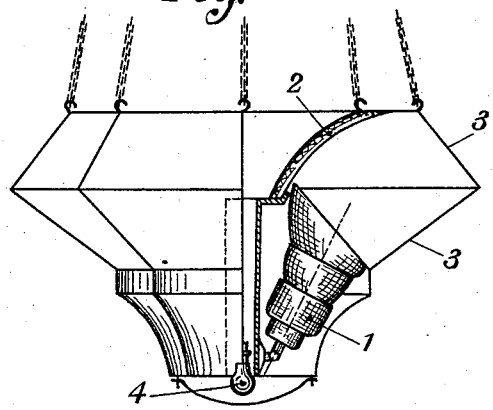
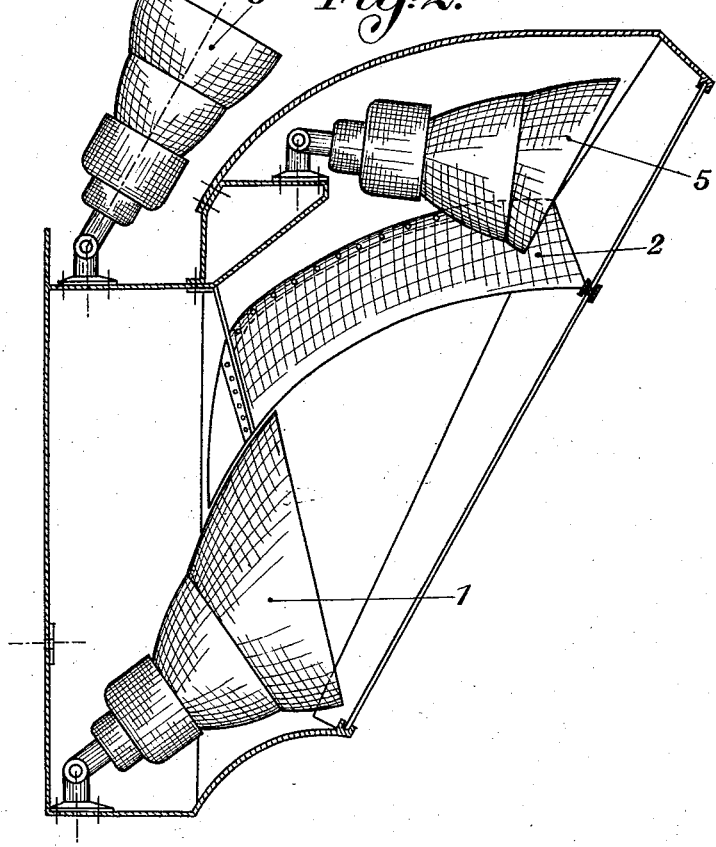

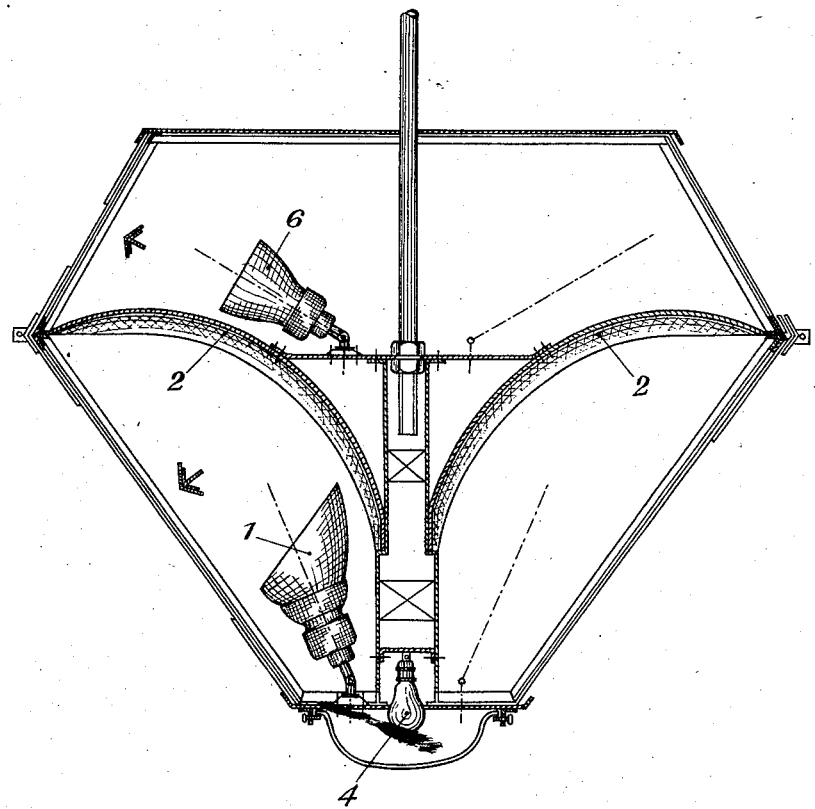
Fig: 3.

Patented Oct. 21, 1930

1,779,378

UNITED STATES PATENT OFFICE

JOSEPHUS THEODORUS CORNELIS van DOOREN, OF HAARLEM, NETHERLANDS

ILLUMINATING DEVICE

Application filed May 29, 1930, Serial No. 456,989, and in Germany July 4, 1928.

This invention relates to illuminating devices for interior illumination and has for its object to provide means for illuminating a room or other interior in such a manner as to obtain a high degree of uniformity of light distribution and a high efficiency.

According to the invention the illuminating device comprises a rear reflector being so shaped and mounted in such a way, that the light rays inside as well as outside the light crater, that is, the area surrounded by the lamp filament, are reflected in a concentrated lightbeam of rays crossing each other as little as possible.

According to the invention the light crater is placed beyond the focus of the reflector.

According to the invention the illuminating device may comprise one or more light sources each provided with a rear reflector and acting in conjunction with an additional reflecting surface to produce a diffused illumination, the additional reflecting surface being set obliquely in relation to the light beam due to the rear reflector and being curved in a plane parallel to the axis of the reflector for the purpose of producing a diffused illumination of substantially uniform intensity over an extended area.

In carrying the invention into effect according to the preferred form the light source and rear reflector form part of a lamp provided with a reflecting shade designed to produce a concentrated light beam which falls obliquely upon the additional reflecting surface. For the purpose of obtaining diffusion of the light the additional reflecting surface may be of a diffusing character or one or more diffusing screens may be employed. Additional lamps providing direct and/or indirect illumination may be employed in conjunction with one or more light sources arranged as hereinbefore defined.

Several examples of illuminating devices constructed in accordance with the invention are illustrated in the accompanying drawings, in which:

Figure 1 shows an illuminating device suspended from the ceiling of a room, partly in elevation and partly in section, Figure 2 is a cross section of an illuminating device for attachment to a wall, Figure 3 is a sectional elevation of a further modification.

In Fig. 1, 1 indicates the lamp provided with a reflector and constituting the source of light of the reflector. The shade 2 is arranged in relation to the strongly concentrated source of light of the reflector in such a way that the rays of light are deflected, partly directly and partly indirectly to illuminate the room. A number of such devices 1, 2 may be arranged in the frame of the illuminating device in the form of a polygon. The apertures in the members 1 and 2 for the passage of the rays of light may be covered by glass plates 3 for the purpose of enhancing the diffusion effect of the illuminating device.

A direct source of light 4 is arranged within the illuminating device and in the bottom thereof and can be similarly covered by glass plates.

In Figure 2, 1 and 2 designate the lamp and shade respectively, whilst 5 is a second reflecting source of light, the rays of which co-act with those of the first source of light in a direct and indirect manner, whilst a third source of light 6 co-operates in an indirect manner only with the two other sources of light. The first and second sources of light 1—5 may be covered by glass plates.

In Figure 3 a series of lamps 1 and shades 2 are arranged in the form of a polygon within the illuminating device, whilst a direct source of light 4 is also provided. The indirect source of light 6 is covered with glass plates as in the case of the other sources of light 1, 4 and so on. The shade 2 may be made, for example, of German silver and each shade may have a special shape for deflecting the rays of each source of light, whereby the technical effect hereinbefore mentioned is attained.

What I claim is:

An illuminating device comprising a source of light, a curved reflecting surface therefor adapted to reflect a substantially parallel beam of light, a second curved reflecting surface so located with respect to the first reflecting surface as to intercept substantially one-half of the parallel beam from the first reflecting surface and distribute a beam of light of substantially uniform intensity at an angle to the beam of light from the first named reflecting surface and over an extended area.

In testimony whereof I affix my signature.

JOSEPHUS THEODORUS CORNELIS van DOOREN.